(12) United States Patent
Davies et al.

(10) Patent No.: US 7,586,810 B2
(45) Date of Patent: Sep. 8, 2009

(54) DIRECTIONAL DE-SIGNATURE FOR SEISMIC SIGNALS

(75) Inventors: Terry Davies, Crawley (GB); Richard Goto, Cowfold (GB)

(73) Assignee: WesternGeco L.L.C., Houston, TX (US)

( * ) Notice: Subject to any disclaimer, the term of this patent is extended or adjusted under 35 U.S.C. 154(b) by 404 days.

(21) Appl. No.: 10/543,862

(22) PCT Filed: Jan. 23, 2004

(86) PCT No.: PCT/GB2004/000280

§ 371 (c)(1),
(2), (4) Date: Jul. 25, 2005

(87) PCT Pub. No.: WO2004/068170

PCT Pub. Date: Aug. 12, 2004

(65) Prior Publication Data

US 2006/0193204 A1    Aug. 31, 2006

(30) Foreign Application Priority Data

Jan. 30, 2003    (GB) ................ 0302123.5

(51) Int. Cl.
*G01V 1/38* (2006.01)
(52) U.S. Cl. .................... 367/23; 367/118
(58) Field of Classification Search .......... 367/23; 181/118
See application file for complete search history.

(56) References Cited

U.S. PATENT DOCUMENTS

| | | | | |
|---|---|---|---|---|
| 5,247,486 A | * | 9/1993 | Regnault | 367/23 |
| 5,400,299 A | * | 3/1995 | Trantham | 367/38 |
| 5,995,905 A | * | 11/1999 | Ikelle et al. | 702/16 |
| 6,081,765 A | * | 6/2000 | Ziolkowski | 702/17 |
| 6,256,589 B1 | * | 7/2001 | Gallotti Guimaraes | 702/18 |
| 6,507,787 B1 | * | 1/2003 | Da Silva et al. | 702/1 |
| 2005/0090987 A1 | * | 4/2005 | Amundsen et al. | 702/14 |

FOREIGN PATENT DOCUMENTS

| | | | |
|---|---|---|---|
| EP | 0166510 | | 1/1986 |
| GB | 2304895 | * | 3/1997 |
| WO | WO 94/10585 | * | 5/1994 |

OTHER PUBLICATIONS

Amundsen et al, Multidimensional signature deconvolution and free-surface multiple elimination of marine multicomponent ocean-bottom seismic data, Oct. 2001, Geophysics vol. 66, No. 5, pp. 1594-1604.*
GB 0302123.5 Search Report Jul. 1, 2003.

* cited by examiner

*Primary Examiner*—Mark Hellner
(74) *Attorney, Agent, or Firm*—Ari Pramudji; Liangang (Mark) Ye; Jeffrey Griffin (57) ABSTRACT

The present invention provides a method and apparatus for directional de-signature of a seismic signal. The method includes forming a plurality of far-field signatures representative of a plurality of seismic signals having a plurality of take-off angles, associating a plurality of traces representative of a plurality of reflections of the seismic signals with the plurality of far-field signatures, and forming a plurality of de-signatured traces from the plurality of traces and the plurality of associated far-field signatures.

53 Claims, 8 Drawing Sheets

DIRECTIONAL DE-SIGNATURE FOR SEISMIC SIGNALS

BACKGROUND OF THE INVENTION

1. Field of the Invention

This invention relates generally to seismic surveys, and, more particularly, to directional de-signature for seismic signals.

2. Description of the Related Art

Underwater seismic exploration is widely used to locate and/or survey subterranean geological formations for hydrocarbon deposits. A survey typically involves deploying one or more seismic sources and one or more seismic sensors at predetermined locations. For example, a seismic cable including an array of seismic sensors and a seismic source may each be towed along the ocean's surface by a survey vessel. A seismic signal, or shot, provided by the seismic sources generates an acoustic signal that travels to the geological formations, where the acoustic signal is reflected and propagates back to the seismic sensors. The seismic sensors receive the reflected signals, which are then processed to generate seismic data, or traces. Analysis of the traces may indicate probable locations of geological formations and hydrocarbon deposits.

A representation of the acoustic signal known as a signature may also be formed. For example, a so-called far-field signature that is representative of a portion of the acoustic signal that is received by the seismic sensor may be calculated. Historically, an estimate of the far-field signature is removed from the seismic data to reduce interference, a process known as "de-signaturing." For one example, a model may be used to estimate the far-field signature and de-signature the seismic signal. For a second example, a statistical estimate of the far-field signature may be calculated based upon previous data and the statistical estimate is used to de-signature the seismic signal.

In traditional de-signaturing processes, the far-field signature is estimated by assuming that all the energy in the shot leaves the seismic source and travels vertically downwards. A vertical de-signaturing may then be performed using the estimated far-field signature. However, not all of the far-field signature data that is recorded with the seismic data travels vertically from the seismic source to the receiver. In reality, the energy in the shot may leave the seismic source along a range of takeoff angles and may arrive at the receivers along a variety of emergent angles. Neglecting the takeoff and emergent angles of the signatures may reduce the accuracy of the de-signaturing process. In particular, the phase and high-frequency power of the far-field signature may be incorrectly calculated, which may, in turn, lead to a reduction in the resolution of the seismic survey.

SUMMARY OF THE INVENTION

In one aspect of the present invention, a method is provided for directional de-signature of a seismic signal. The method includes forming a plurality of far-field signatures representative of a plurality of seismic signals having a plurality of take-off angles, associating a plurality of traces representative of a plurality of reflections of the seismic signals with the plurality of far-field signatures, and forming a plurality of de-signatured traces from the plurality of traces and the plurality of associated far-field signatures.

In another aspect of the instant invention, an apparatus is provided for directional de-signature of a seismic signal. The apparatus includes a storage unit for storing data representative of a seismic signal, a plurality of traces representative of a plurality of reflected seismic signals, and a plurality of take-off angles and at least one notional signature corresponding to the seismic signal. The apparatus also includes a processor capable of forming a plurality of de-signatured traces using the seismic signal, the plurality of traces, the take-off angles, and the at least one notional signature.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
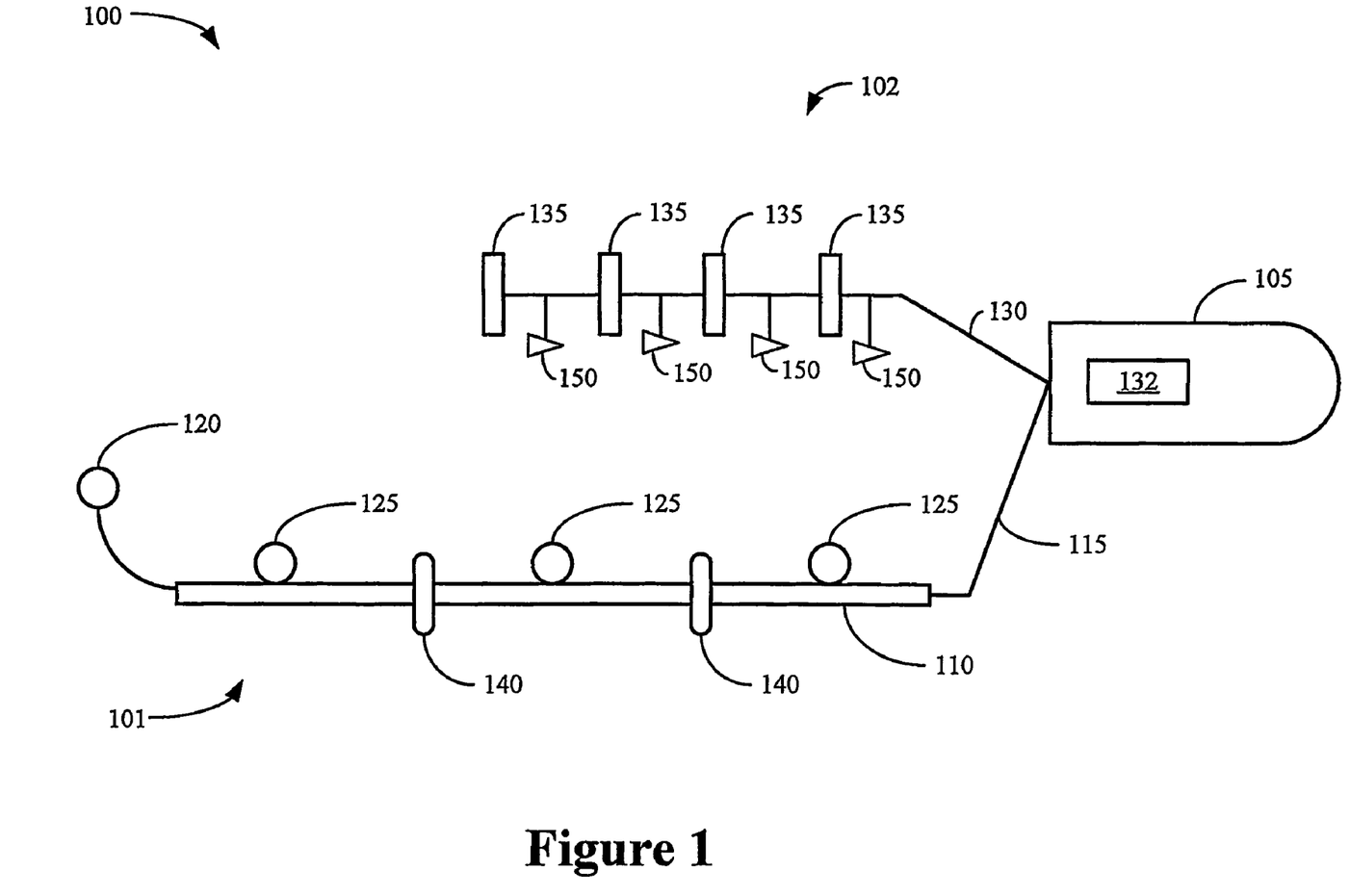
FIG. 1 conceptually illustrates a seismic survey system.

FIG. 1 conceptually illustrates a seismic survey system 100 comprising a towed receiver array 101 and a towed source array 102, in accordance with one embodiment of the present invention. A seismic survey vessel 105 tows a seismic streamer 110 by way of a first tow cable 115. It will be appreciated that the seismic survey system 100 may be used in any desirable environment. For example, in various alternative embodiments, the seismic survey system 100 may be used in bodies of water including oceans, seas, fresh water, brackish water, and the like.

The streamer 110 may comprise a tail buoy 120. The tail buoy 120 typically identifies the end of the streamer 110. The streamer 110 is additionally provided with one or more levelling devices or "birds" 125 that regulate the depth of the streamer 110 within the water. The streamer 110 also includes one or more seismic receivers 140. In one embodiment, the seismic receivers 140 are hydrophones, but the present invention is not so limited. In alternative embodiments, the seismic receivers 140 may be any desirable receiver. Furthermore, it will be appreciated by those of ordinary skill in the art that the number of birds 125 and receivers 140 is a matter of design choice and not material to the present invention.

The seismic survey vessel 105, by way of a second tow cable 130, also tows one or more seismic sources 135, which generate an acoustic wave (not shown) in the water that generally travels in a downward direction towards the sea bed (also not shown). In one embodiment, the seismic sources 135 may be airguns. However, the present invention is not so limited. In alternative embodiments, the seismic sources 135 may be any device capable of generating the desired acoustic wave, such as piezoelectric devices, hydraulic vibrators, seismic source arrays, and the like. The towed source array 102 also includes one or more receivers 150, which may be coupled to the second tow cable 130. In one embodiment, the receivers 150 are hydrophones, but the present invention is not so limited. In alternative embodiments, the receivers 150 may be any desirable receiver. Furthermore, it will be appreciated by those of ordinary skill in the art that the number of seismic sources 135 and receivers 150 is a matter of design choice and not material to the present invention.

In operation, the seismic sources 135 impart an acoustic wave through the water and into the ocean floor. The acoustic wave reflects and refracts from various structures (also not shown) within the sea bed and above the seabed, and the reflected and/or refracted wave (also not shown) is detected by the receivers 140 in the streamer 110. As is well known in the art, upon receipt of the reflected and/or refracted wave, the receiver 140 typically generates analogue signals. In one embodiment, the analogue signals may be converted to digital signals by digital-to-digital converters (not shown) in the streamer 110.

For the sake of clarity, FIG. 1 illustrates two towed arrays 101, 102 comprising two tow cables 115, 130 and one streamer 110 attached to the first tow cable 115. However, any number of arrays may contain any number of streamers, in accordance with conventional practice. The two towed arrays 101, 102 may further comprise devices not shown in FIG. 1, in accordance with conventional practice, such as a towed buoy or a positioning device. Furthermore, it should be appreciated that the seismic sources 135 and the receiver 140 may be towed by the same cable. In other embodiments, the seismic sources 135 may be placed on a mobile or semi-mobile unit (not shown) positioned some distance away from the seismic survey vessel 105. It should also be appreciated that, in one embodiment, the seismic streamer 110 may be an ocean-bottom cable ("OBC"). OBCs may be deployed on the seafloor to record and relay data to the seismic survey vessel 105. OBCs generally enable surveying in areas where towed streamers 110 are unusable or disadvantageous, such as in areas of obstructions and shallow water inaccessible to ships. In an alternative embodiment, the receivers 140 may be buried in the earth or placed in a borehole.

A signal processing unit 132 is provided to process the analogue and/or digital signals that are generated by the receivers 140. Although not required for the operation of the present invention, it will be appreciated by those of ordinary skill in the art that the signal processing unit 132 may comprise a data collection unit (not shown) for receiving the analogue and/or digital signals that are generated by the receivers 140 and a data processing unit (also not shown). In one embodiment, the signal processing unit 132 is deployed on the seismic survey vessel 105. However, it will be appreciated by those of ordinary skill in the art that portions of the signal processing unit 132 may be located in any desirable location, including, but not limited to, other vessels (not shown) and on-shore facilities (not shown). For example, in one embodiment, the data collection unit may be deployed on the seismic survey vessel 105 and the data processing unit may be deployed at a remote on-shore facility.

The analogue and/or digital signals generated by the receivers 140 are transmitted over the streamer 110 and the tow cable 130 to the signal processing unit 132. In various alternative embodiments, the analogue and/or digital signals are transmitted to the signal processing unit 132 via electrical or optical wires, cables, or fibres. Thus, these analogue and/or digital signals may be, for example, electrical and/or optical signals. In another set of alternative embodiments, the analogue and/or digital signals are transmitted to the signal processing unit via wireless transmission devices such as a radio-frequency transmitter and the like. Furthermore, in yet another set of possible embodiments, the analogue and/or digital signals can be stored and transmitted to the signal processing unit 132 using any storage medium, including, but not limited to, recording tape, magnetic disks, compact disks, and DVDs. The signal processing unit 132 uses the analogue and/or digital signals to form one or more traces representative of the analogue and/or digital signals, in a manner well known to those of ordinary skill in the art.

In an alternative embodiment not shown, the signal processing unit 132, or at least the data processing unit, is located at an on-shore facility (not shown). Accordingly, the signals generated by the seismic receivers 140 and near-field receivers 150 may be stored on, e.g., the survey vessel 105 for later processing. Some embodiments may also, in addition to or in lieu of storing the signals, transmit them to the on-shore facility. This may be done, for example, over a satellite link. Thus, it is not necessary to the practice of the invention that these signals be processed at the point or site of their collection.

To collect information used to de-signature the traces, and thereby reduce or eliminate the contribution of the acoustic signal to the traces, one or more near-field receivers 150 are positioned near the seismic sources 135, in accordance with one embodiment of the present invention. For example, the near-field receivers 150 may be hydrophones capable of recording calibrated marine source data. As described in more detail below, the data recorded by the near-field receiver 150 is used to estimate a so-called "notional" signature, which may be used to compute a plurality of angle-dependent far-field signatures. The signal processing unit 132 may use the plurality of angle-dependent far-field signatures and the plurality of traces to form a plurality of de-signatured traces. By using the angle-dependent far-field signatures to de-signature the traces, the accuracy of the de-signaturing process may be improved and the resolution of the seismic survey may be increased.

Figures 2A, 2B:
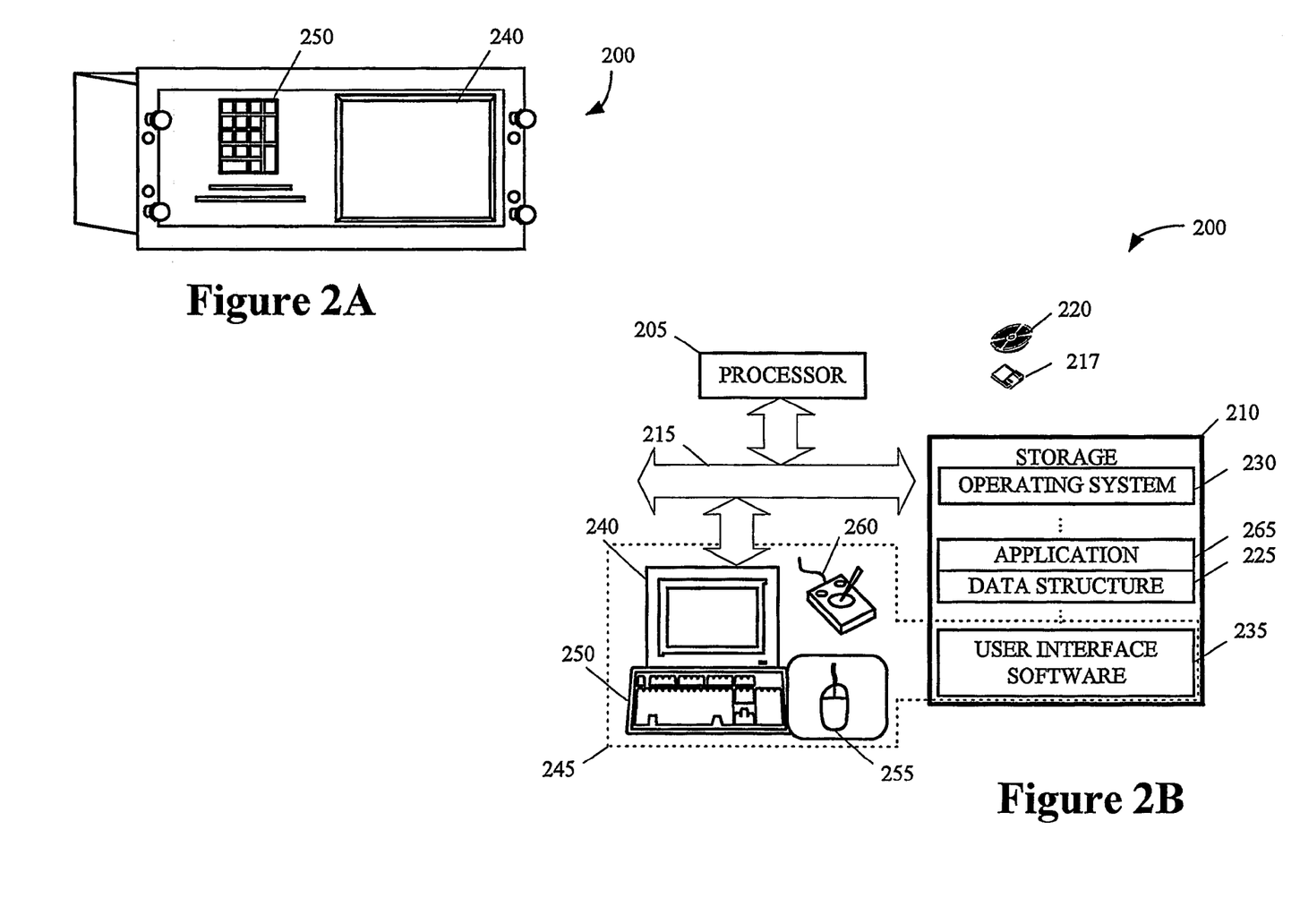
FIGS. 2A-B each show aspects of a rack-mounted computing apparatus that may be used in the seismic survey system shown in FIG. 1.

Referring now to FIGS. 2A-B, a rack-mounted computing apparatus 200 that may be deployed on the survey vessel 105 to implement the signal processing unit 132 is shown. The computing apparatus 200 includes a processor 205 communicating with some storage 210 over a bus system 215. The storage 210 may include a hard disk and/or random access memory ("RAM") and/or removable storage such as a floppy magnetic disk 217 and an optical disk 220. The storage 210 is encoded with a data structure 225 storing the signals collected as discussed above, an operating system 230, user interface software 235, and an application 265. The user interface software 235, in conjunction with a display 240, implements a user interface 245. The user interface 245 may include peripheral I/O devices such as a key pad or keyboard 250, a mouse 255, or a joystick 260. The processor 205 runs under the control of the operating system 230, which may be practically any operating system known to the art. The application 265 is invoked by the operating system 230 upon power up, reset, or both, depending on the implementation of the operating system 230.

The rack-mounted computing apparatus 200 may be used to implement at least a portion of the signal processing unit 132 (shown in FIG. 1). Consequently, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fibre, or some other suitable transmission medium known to the art. The invention is not limited by these aspects of any given implementation.

Figure 3:
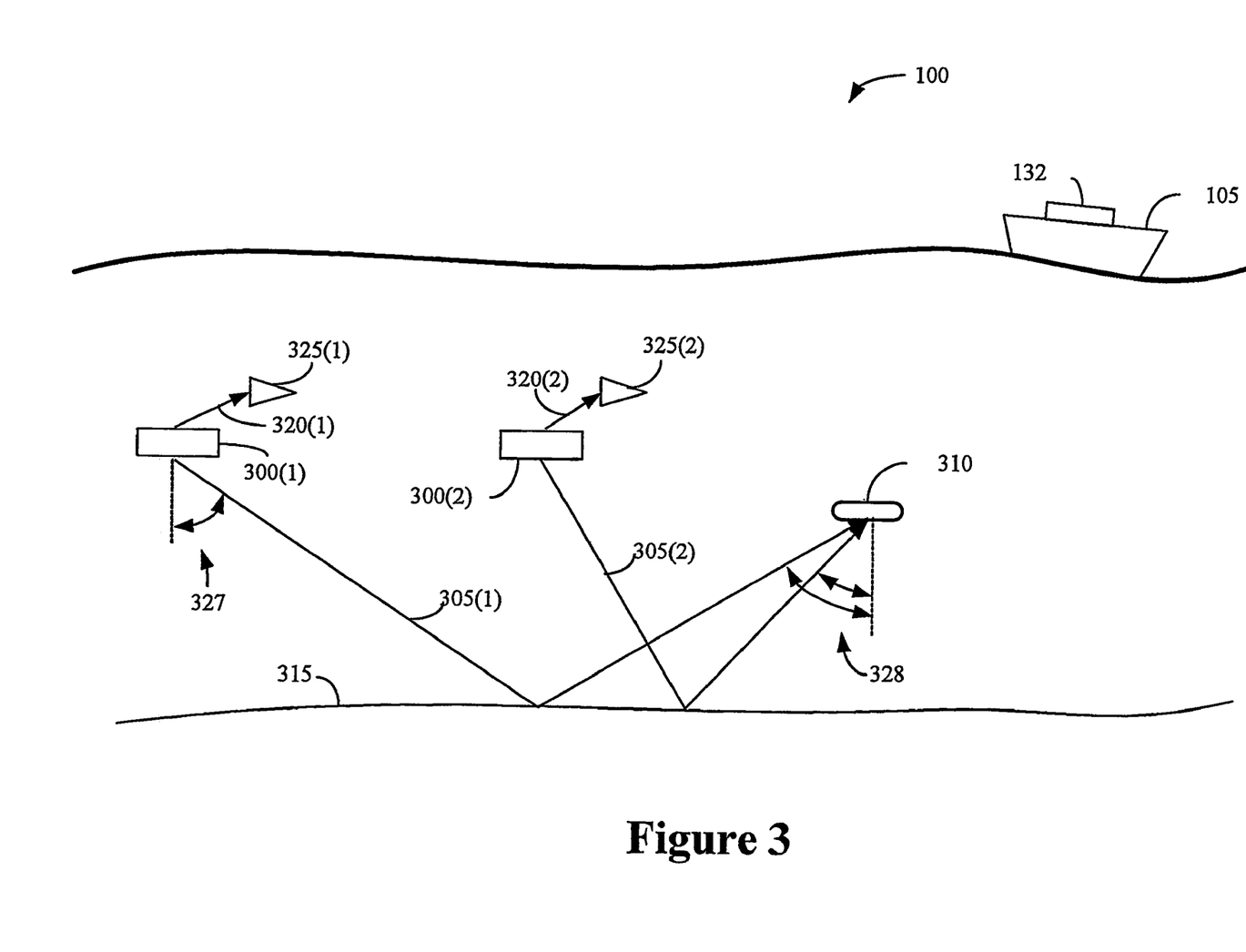
FIG. 3 conceptually illustrates various signals that may be provided in the seismic survey system illustrated in FIG. 1.

Referring now to FIG. 3, a schematic diagram illustrating various signals encountered in the operation of the seismic survey system 100 is shown. Two seismic sources 300(1-2) provide acoustic signals 305(1-2), respectively, that may be received by a receiver 310 after being reflected by a floor 315. As discussed above, the received acoustic signals 305(1-2) are transmitted to the signal processing unit 132, which may form a plurality of traces from the received acoustic signals 305(1-2). In the interest of clarity, the acoustic signals 305(1-2) are depicted as reflecting from the floor 315. However, those of ordinary skill in the art will appreciate that the acoustic signals 305(1-2) may also penetrate the floor 315 and may be reflected by the various strata and other geologic features beneath the floor 315. Furthermore, to avoid obscuring the relevant details, the tow cables 115, 130, the streamer 110, and other components of the seismic survey system 100 are not shown in FIG. 3.

The seismic sources 300(1-2) also provide two direct arrival acoustic signals 320(1-2) to two respective near-field receivers 325(1-2). The direct arrival acoustic signal 320(1-2) may be received by the respective near-field receiver 325(1-2) and may form a portion of a near-field signature. In one embodiment, the near-field signature is transmitted to the signal processing unit 132, which uses the near-field signature to estimate at least one so-called notional signature representative of the acoustic signals 305(1-2) near the seismic sources 300(1-2). For example, the seismic source 300(1) provides the direct arrival acoustic signal 320(1) to the near-field receiver 325(1).

The various signals 305(1-2) each have a corresponding take-off angle 327, which is measured at the seismic sources 300(1-2). In one embodiment, the take-off angles 327 are measured from the vertical, as indicated by the dashed lines in FIG. 3. The various signals 305(1-2) also each have a corresponding emergent angle 328, which is measured at the receiver 310. In one embodiment, the emergent angles 328 are measured from the vertical, as indicated by the dashed lines in FIG. 3. If the floor 315 is exactly horizontal, the take-off angles 327 of the acoustic signals 305(1-2) are equal to the emergent angles 328. However, for dipping data, wherein the floor 315 is not generally horizontal, the take-off angles 327 of the acoustic signals 305(1-2) may not be equal to the emergent angles 328.

Figure 4A:
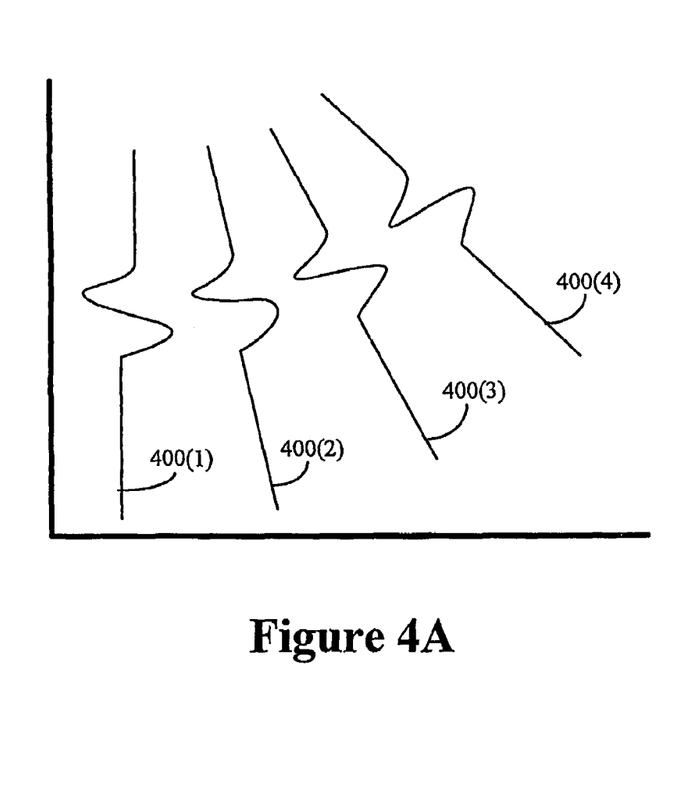
FIGS. 4A and 4B conceptually illustrates angle-dependent signatures that may be formed using the various signals shown in FIG. 3.

The signal processing unit 132 may use the at least one notional signature to form a plurality of angle-dependent far-field signatures 400(1-4), as shown in FIG. 4A. However, it will be appreciated that the angle-dependent far-field signatures 400(1-4) depicted in FIG. 4A are stylised representations of actual angle-dependent far-field signatures 400(1-4), which may include a variety of features not shown herein. Furthermore, it will be appreciated that the number of angle-dependent far-field signatures 400(1-4) is a matter of design choice, driven in part by the desired angular resolution, and is not material to the present invention.

Each angle-dependent far-field signature 400(1-4) corresponds to the take-off angle 327 of the corresponding acoustic signal. In one embodiment, the signal processing unit 132 may use a model to compute the plurality of angle-dependent far-field signatures 400(1-4) from the at least one notional signature. In an alternative embodiment, the signal processing unit 132 may use statistical measures derived from previous shots to compute the plurality of far-field signatures 400(1-4) from the at least one notional signature. However, it will be appreciated that the present invention is not limited to a particular process for computing the far-field signatures 400(1-4), and any technique known in the art for estimating and/or computing the far-field signatures 400(1-4) may be used.

Moreover, it will be appreciated by those of ordinary skill in the art that the far-field signatures 400(1-4) may also vary in azimuth. For example, in one embodiment, the sources 300(1-2) and the receiver 310 may line up along a north-south line. In another embodiment, such as may be used in undershooting applications, the sources 300(1-2) and the receiver 310 may line up along an east-west line. The response of both the sources 300(1-2) and the receiver 310 will usually be different at different azimuths. For example, the response of the sources 300(1-2) and/or the receiver 310 aligned in a north-south orientation may differ from the response of the sources 300(1-2) and/or the receiver 310 aligned in an east-west orientation. Thus, the angle-dependent far-field signatures 400(1-4) may also, in one embodiment, reflect an azimuthal dependence.

Figure 4B:
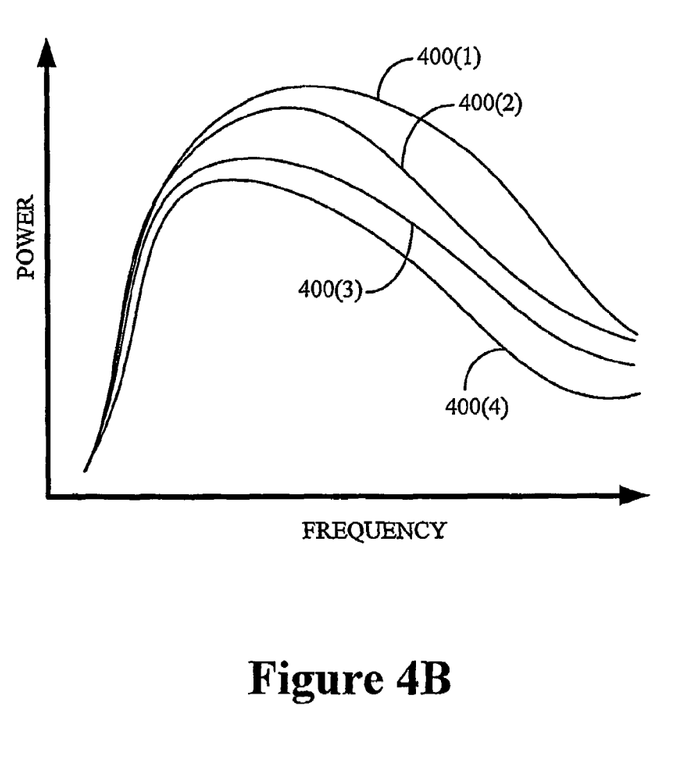

As shown in FIG. 4B, the power in the angle-dependent far-field signatures 400(1-4) may vary with take-off angle 327 and/or frequency. In one embodiment, the power in the angle-dependent far-field signatures 400(1-4) decreases with increasing take-off angle 327. The decrease in power may be present at substantially all frequencies. However, in one embodiment, the decrease in power with increasing take-off angle 327 is larger at higher frequencies. For example, the high frequency power of the vertical far-field signature 400(1) is larger than the high frequency power of the other angle-dependent far-field signatures 400(2-4), which correspond to larger take-off angles 327. The signal processing unit 132 may therefore form de-signatured traces using the traces and the angle-dependent far-field signatures 400(1-4), in a manner described in detail below. Consequently, the high frequency content in the de-signatured traces may be increased, and amplitude and/or phase errors in the de-signatured traces may be reduced or eliminated.

However, in various alternative embodiments, the power in the angle-dependent far-field signatures 400(1-4) may not vary uniformly with take-off angle 327 and/or frequency. In one illustrative embodiment, the sources 300(1-2) may be deployed deliberately or accidentally such that the maximum power output is not in the vertical direction and such that the power can decrease as well as increase with some take-off angles 327. For example, the sources 300(1-2) may be deployed in tilted and/or tuned arrays. In another illustrative embodiment, a ghost may be included in the far-field signatures 400(1-4), in which case the high frequency notch may increase with take-off and emergent angles 327, 328, as will be appreciated by those of ordinary skill in the art. As discussed above, amplitude and/or phase errors caused, at least in part, by the variation of the far-field signatures 400(1-4) may be reduced or eliminated by forming de-signatured traces using the traces and the angle-dependent far-field signatures 400(1-4).

Figures 5A, 5B:
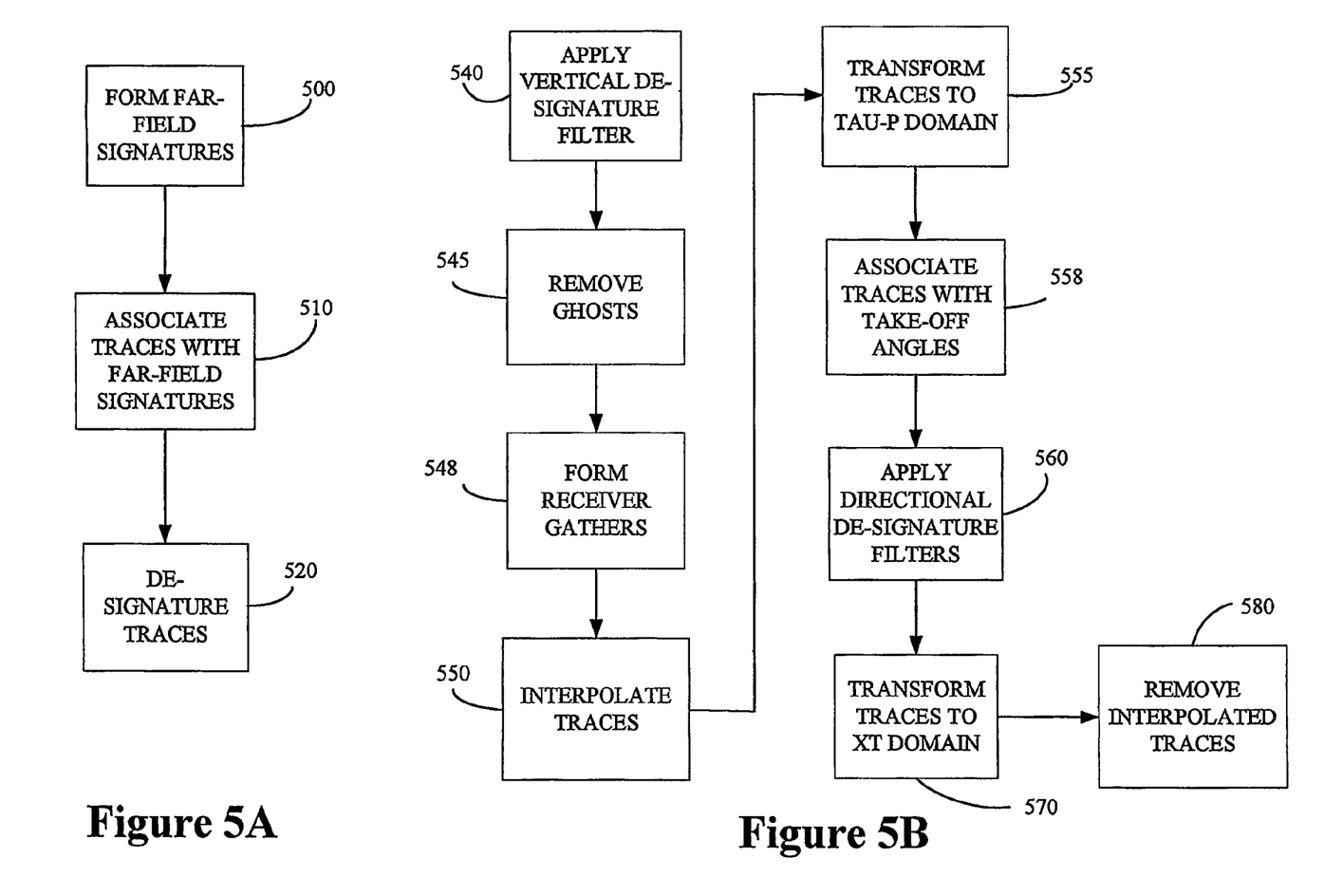
FIG. 5A illustrates a directional de-signaturing process that may be used in the system shown in FIG. 1.
FIG. 5B illustrates a first exemplary process for applying directional de-signature filters that may be used in the directional de-signaturing process shown in FIG. 5A.

Referring now to FIG. 5A, a diagram of one embodiment of an angle-dependent de-signaturing process is shown. The plurality of angle-dependent far-field signatures 400(1-4) are formed (at 500), in the manner described above. For example, in one embodiment, the plurality of angle dependent de-signature filters are formed (at 500) to correct each of the plurality of angle dependent far-field signatures to a target wavelet. The traces are associated (at 510) with one or more of the plurality of angle-dependent far-field signatures 400(1-4). In one embodiment, associating (at 510) the plurality of angle-dependent far-field signatures 400(1-4) with the traces includes associating (at 510) the traces with one or more take-off angles 327. For example, the traces may be associated (at 510) with one or more take-off angles 327 by forming a common receiver station gather, in a manner known to those of ordinary skill in the art. The traces are de-signatured (at 520) using the plurality of angle-dependent far-field signatures 400(1-4) and the associated traces. In one embodiment, de-signaturing (at 520) the traces includes forming a plurality of angle-dependent de-signature filters using the plurality of angle-dependent far-field signatures 400(1-4) and applying the plurality of angle-dependent de-signature filters to the traces.

Referring now to FIG. 5B, one embodiment of a first exemplary process for directional de-signature is shown. In the embodiment illustrated in FIG. 5B, directional de-signature includes applying (at 540) a vertical de-signature filter to the traces. Applying (at 540) the vertical de-signature filter may include selecting a vertical signature, e.g. the angle-dependent signature 400(1) shown in FIG. 4, and forming a vertical de-signaturing filter from the selected vertical signature. For example, a common receiver station gather typically includes traces from many shots and so it may not be possible to apply the directional de-signature to the trace corresponding to each shot individually. In this case, applying (at 540) the vertical de-signature filter to each trace may, at least in part, account for shot-to-shot variations. Once the shot-to-shot variations have been, at least in part, removed by applying (at 540) the vertical de-signature, applying (at 520) the directional de-signature may include applying an average directivity correction that does not vary substantially from shot to shot.

As described in more detail below, one or more ghost signals may be removed (at 545) from the traces. In one embodiment, common receiver station gathers may be formed (at 548). By forming (at 548) the common receiver station gathers, the dips on the data represent the take-off angle 327 at the source 300(1-2), as will be appreciated by those of ordinary skill in the art having benefit of the present disclosure. A portion of the traces may then be interpolated (at 550). For example, the portion of the traces may be interpolated (at 550) to avoid aliasing, as will be appreciated by those of ordinary skill in the art. The traces may then be transformed (at 555) from a XT domain to a $\tau$-P domain. Transforming (at 555) the traces from the XT domain to the $\tau$-P domain allows each trace to be associated (at 558) with a respective take-off angle 327 and an appropriate far-field signature.

The plurality of angle-dependent de-signature filters may be applied (at 560) to the transformed traces and the resulting de-signatured traces may be transformed (at 570) from the $\tau$-P domain to the XT domain. In one embodiment, transforming (at 555) the traces from the $\tau$-P domain to the XT domain may include removing (at 580) the interpolated portion of the traces.

Figure 5C:
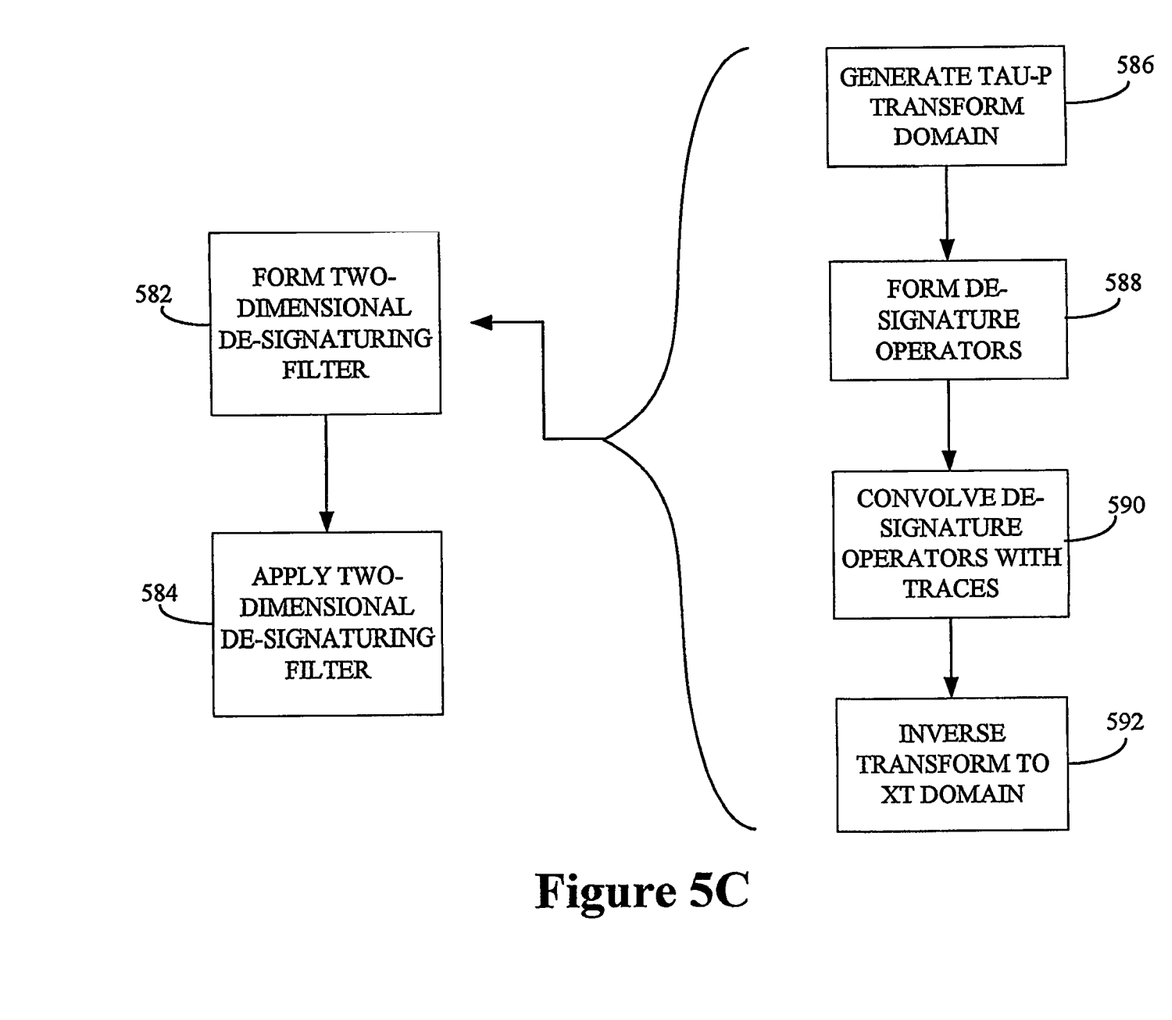
FIG. 5C shows a second exemplary process for applying a two-dimensional directional de-signature filer that may be used in the directional de-signaturing process shown in FIG. 5A.

A second exemplary process for directional de-signature, shown in FIG. 5C, includes forming (at 582) a two-dimensional de-signaturing filter representative of the plurality of angle-dependent de-signature filters using the plurality of angle-dependent far-field signatures 400(1-4) and applying (at 584) the two-dimensional de-signaturing filter to the traces. In one embodiment, the two-dimensional de-signaturing filter is formed (at 582) by generating (at 586) a $\tau$-P transform domain consisting of a spike on each of a plurality of traces. Each trace represents a different take-off angle 327. In one alternative embodiment, the $\tau$-P transform domain may consist of an appropriately band-limited wavelet on the traces. For example, in one embodiment, the spike and/or wavelet will typically be at the same $\tau$ time, e.g. at 2000 ms in a 4000 ms $\tau$-P transform domain.

Appropriate de-signature operators may be formed (at 588) and convolved (at 590) with the traces, which may include the spike and/or the wavelet, for the corresponding take-off angle 327. For example, the de-signature operator corresponding to a take-off angle 327 of about 30 degrees may be convolved (at 590) with the traces corresponding to a take-off angle 327 of about 30 degrees. The two-dimensional de-signaturing filter may then be formed (at 582) by, for example, inverse transforming (at 592) the $\tau$-P transform domain to the XT domain. However, as will be appreciated by those of ordinary skill in the art, the present invention is not limited to the aforementioned process of forming (at 582) the two-dimensional de-signaturing filter. Forming (at 582) the two dimensional filter generally involves capturing the impulse response in XT space of the application of the angle dependent de-signature filters in τ-P space and any desirable process of accomplishing this may be used.

In one embodiment, applying (at 584) the two-dimensional de-signaturing filter to the traces may include convolving the two-dimensional de-signaturing filter with the traces sorted in the common receiver station gathers. In one embodiment, convolving the two-dimensional de-signaturing filter with the traces may be done in the XT domain. However, it will be appreciated by those of ordinary skill in the art that the present invention is not limited to applications in the XT domain. For example, in alternative embodiments, the two-dimensional de-signaturing filter may be applied to the traces in the f-k domain and/or convolved with the traces in the f-x domain.

Figure 6:
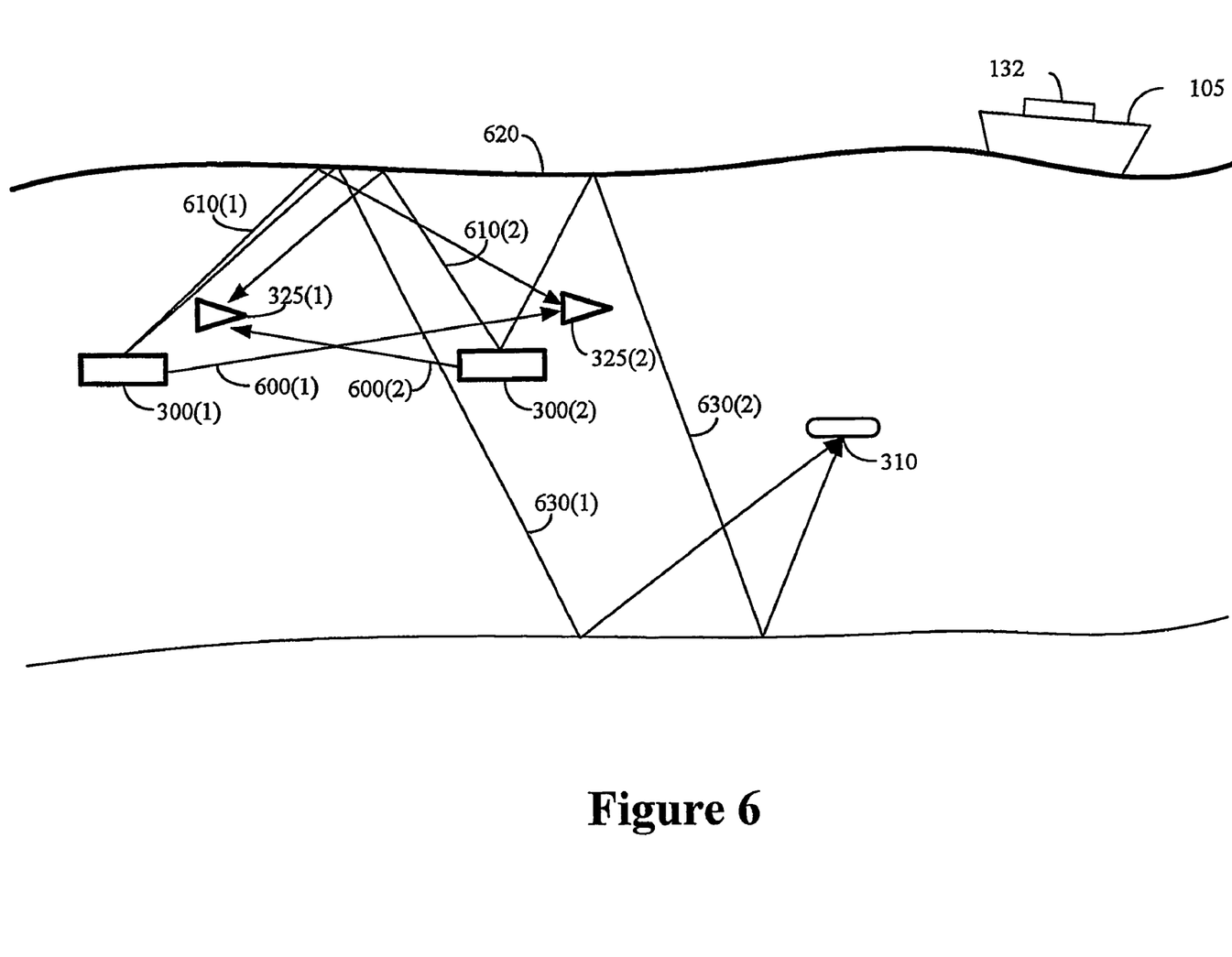
FIG. 6 conceptually illustrates interference signals that may be provided in the seismic survey system illustrated in FIG. 1.

Referring now to FIG. 6, various interference signals that may form a portion of the near-field signature are shown. In one embodiment, the at least one notional signature may be generated from a near-field signature received by the near-field receivers 325(1-2) by removing at least a portion of interference from other signals. For one example, the seismic sources 300(1-2) may provide interference signals 600(1-2), which may interfere with the direct arrival acoustic signal 320(1-2) shown in FIG. 3. For example, the seismic source 300(1) provides the interference signal 600(1) to the near-field receiver 325(2). For another example, the seismic source 300(2) provides the interference signal 600(2) to the near-field receiver 325(1). For yet another example, the seismic sources 300(1-2) may provide ghost signals 610(1-2) that are reflected from a sea surface 620. The ghost signals 610(1-2) may be received by the near-field receivers 325(1-2) and may interfere with the direct arrival acoustic signal 320(2) shown in FIG. 3. Although not shown in FIG. 6, those of ordinary skill in the art will appreciate that the signals in FIG. 6 may have corresponding take-off and emergent angles.

To reduce or eliminate the interference caused by the aforementioned signals, the signal processing unit 132 may generate the aforementioned at least one notional signature by processing the near-field signature received by the near field receivers 325(1-2) to remove the interference from the interference signals 600(1-2), the ghost signals 610(1-2), and any other like signals. In one embodiment, the signal processing unit 132 may record the near-field signature and/or the at least one notional signature on tape for subsequent processing.

Figure 7:
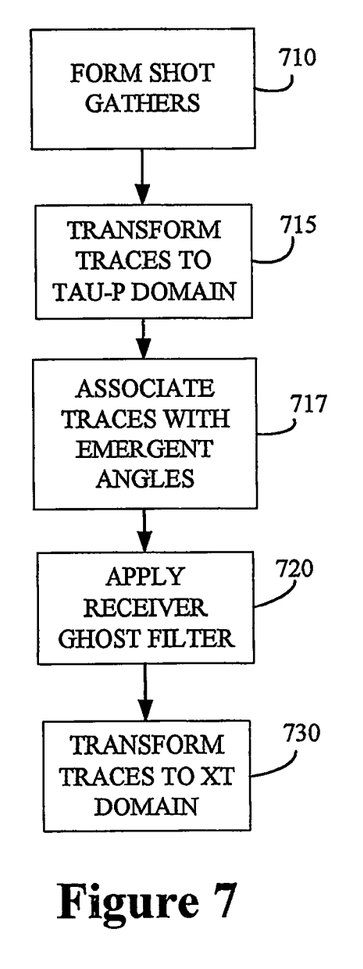
FIG. 7 illustrates one embodiment of a process for removing a receiver ghost signal.

In one embodiment, the signal processing unit 132 may also remove the receiver ghost signals 630(1-2), as shown in FIG. 7. The receiver ghost may vary as the emergent angle (328) varies. A common source gather, also known as a common shot gather, may be formed (at 710) from the traces. By forming (at 710) the shot gather, the dips in the data represent the emergent angle 328 at the receiver 310. The traces are transformed (at 715) from a XT domain to a τ-P domain so that each trace can be associated (at 717) with a single emergent angle. In one embodiment, transforming (at 715) the traces from the XT domain to the τ-P domain may include interpolating a portion of the traces. The traces are then associated (at 717) with the emergent angle.

At least one appropriate receiver ghost filter is applied (at 720) to the transformed traces and the resulting filtered traces may be transformed (at 730) from the τ-P domain to the XT domain. In one embodiment, transforming (at 730) the traces from the τ-P domain to the XT domain may include removing the interpolated portion of the traces.

In an alternative embodiment, removing the receiver ghost signals 630(1-2) from the traces includes forming a two-dimensional ghost removal filter representative of the plurality of receiver ghost signals 630(1-2) and applying the two-dimensional ghost removal filter to a common source gather. In alternative embodiments, the two-dimensional ghost removal filter may also be applied in other domains such as the f-x or f-k domains, as will be appreciated by those of ordinary skill in the art.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A method for processing seismic data for geological exploration, comprising:

receiving a plurality of seismic signals that were acquired from one or more seismic receivers, wherein the plurality of seismic signals comprises a plurality of take-off angles;

forming a plurality of far-field signatures representative of the plurality of seismic signals;

associating a plurality of traces representative of a plurality of reflections of the seismic signals with the plurality of take-off angles;

forming a plurality of de-signatured traces from the plurality of associated traces and the plurality of far-field signatures; and storing the plurality of de-signatured traces to a computer memory.

2. A method for processing seismic data for geological exploration, comprising:

receiving a plurality of seismic signals that were acquired from one or more seismic receivers, wherein the plurality of seismic signals comprises a plurality of take-off angles;

forming a plurality of far-field signatures representative of the plurality of seismic signals, wherein the far-field signatures are formed by determining at least one notional signature using at least one near-field detector;

associating a plurality of traces representative of a plurality of reflections of the seismic signals with the plurality of far-field signatures;

forming a plurality of de-signatured traces from the plurality of traces and the plurality of associated far-field signatures; and storing the plurality of de-signatured traces to a computer memory.

3. The method of claim 2, wherein forming the plurality of far-field signatures comprises forming the plurality of far-field signatures from the at least one notional signature, the plurality of take-off angles, and a model.

4. The method of claim 2, wherein associating the plurality of traces with the plurality of far-field signatures comprises associating the plurality of traces with the plurality of take-off angles.

5. The method of claim 1, wherein associating the plurality of traces with the plurality of take-off angles comprises gathering a portion of the traces corresponding to a common receiver station.

6. A method for processing seismic data for geological exploration, comprising:

receiving a plurality of seismic signals that were acquired from one or more seismic receivers, wherein the plurality of seismic signals comprises a plurality of take-off angles;

forming a plurality of angle-dependent de-signature filters using a plurality of far-field signatures representative of the plurality of seismic signals having a plurality of take-off angles;

associating a plurality of traces representative of a plurality of reflections of the seismic signals with the plurality of far-field signatures;

forming a plurality of de-signatured traces from the plurality of traces and the plurality of associated far-field signatures; and storing the plurality of de-signatured traces to a computer memory.

7. The method of claim 6, wherein forming the plurality of de-signatured traces comprises applying the plurality of angle-dependent de-signature filters to the plurality of traces.

8. The method of claim 7, wherein applying the plurality of angle-dependent de-signature filters to the plurality of traces comprises transforming the plurality of traces from an XT domain to a τ-P domain.

9. The method of claim 8, wherein transforming the plurality of traces from the XT domain to the τ-P domain comprises interpolating a portion of the traces before transforming the traces to the τ-P domain.

10. The method of claim 8, wherein applying the plurality of angle-dependent de-signature filters to the plurality of traces comprises applying the plurality of angle-dependent de-signature filters to the plurality of transformed traces in the τ-P domain to form the de-signatured traces.

11. The method of claim 10, wherein applying the plurality of angle-dependent de-signature filters to the plurality of traces comprises transforming the de-signatured traces from the τ-P domain to the XT domain.

12. The method of claim 11, wherein transforming the de-signatured traces from the τ-P domain to the XT domain comprises removing the interpolated portion of the de-signatured traces after transforming the de-signatured traces from the τ-P domain to the XT domain.

13. The method of claim 6, wherein forming the plurality of de-signatured traces comprises applying a vertical de-signature filter selected from the plurality of far-field signatures to the traces.

14. The method of claim 13, further comprising applying an average directivity correction to the plurality of traces.

15. The method of claim 1, further comprising removing at least one receiver ghost from the plurality of traces.

16. A method for processing seismic data for geological exploration, comprising:

receiving a plurality of seismic signals that were acquired from one or more seismic receivers, wherein the plurality of seismic signals comprises a plurality of take-off angles;

forming a plurality of far-field signatures representative of the plurality of seismic signals;

associating a plurality of traces representative of a plurality of reflections of the seismic signals with the plurality of far-field signatures;

forming a plurality of de-signatured traces from the plurality of traces and the plurality of associated far-field signatures;

associating the plurality of traces with a plurality of emergent angles;

transforming the traces from an XT domain to a τ-P domain;

applying at least one receiver ghost filter to the transformed traces; transforming the traces from the τ-P domain to the XT domain; and storing the traces to a computer memory.

17. A method, for processing seismic data for geological exploration comprising:

receiving a plurality of seismic signals that were acquired from one or more seismic receivers, wherein the plurality of seismic signals comprises a plurality of take-off angles;

forming a plurality of far-field signatures representative of a plurality of seismic signals;

associating a plurality of traces representative of a plurality of reflections of the seismic signals with the plurality of far-field signatures;

forming a plurality of de-signatured traces from the plurality of traces and the plurality of associated far-field signatures using a two-dimensional filter; and storing the plurality of de-signatured traces to a computer memory.

18. The method of claim 17, wherein forming the plurality of de-signatured traces using the two-dimensional filter comprises: forming the two-dimensional filter; and applying the two-dimensional filter to the traces.

19. The method of claim 18, wherein forming the two-dimensional filter comprises: generating a τ-P transform domain; forming at least one de-signature operator corresponding to at least one take-off angle; convolving the at least one de-signature operator with at least one trace corresponding to the at least one take-off angle; and inverse transforming the τ-P transform domain to an XT domain.

20. The method of claim 17, wherein forming the plurality of de-signatured traces comprises forming the plurality of de-signatured traces using a two-dimensional ghost removal filter.

21. A method for processing seismic data for geological exploration, comprising:

generating a plurality of seismic signals having a plurality of take-off angles using at least one seismic source;

receiving a plurality of reflections of the seismic signals at a plurality of receivers, wherein the plurality of reflected seismic signals have a corresponding plurality of emergent angles at the plurality of receivers;

recording a plurality of traces representative of the reflected seismic signals;

forming a plurality of de-signatured traces from the plurality of seismic signals, the plurality of traces, the plurality of take-off angles, and the plurality of emergent angles; and storing the plurality of de-signatured traces to a computer memory.

22. The method of claim 21, wherein forming the plurality of de-signatured traces comprises associating each of the plurality of traces with at least one of the plurality of takeoff angles.

23. The method of claim 22, wherein associating each of the plurality of traces with at least one of the plurality of takeoff angles comprises gathering a portion of the traces corresponding to a common receiver.

24. The method of claim 1, wherein forming the plurality of de-signatured traces comprises forming at least one notional signature using the seismic signal.

25. The method of claim 24, wherein forming the at least one notional signature comprises receiving the seismic signal at a near-field receiver proximate the seismic source.

26. The method of claim 25, wherein receiving the seismic signal at a near-field receiver proximate the seismic source comprises receiving the seismic signal at a near-field receiver about 1 meter from the seismic source.

27. The method of claim 24, wherein forming the at least one notional signature comprises removing seismic signals generated by other seismic sources from the seismic signal received by the near-field receiver.

28. The method of claim 24, wherein forming the at least one notional signature comprises removing ghost signals from the seismic signal received by the near-field receiver.

29. method of claim 24, wherein forming the plurality of de-signatured traces comprises forming a plurality of far-field signatures using the at least one notional signature.

30. The method of claim 29, wherein forming the plurality of far-field signatures using the at least one notional signature comprises calculating the plurality of far-field signatures for each of the plurality of takeoff angles.

31. The method of claim 30, wherein forming the plurality of de-signatured traces comprises forming a plurality of angle-dependent filters from the plurality of far-field signatures.

32. The method of claim 31, wherein forming the plurality of de-signatured traces comprises applying the plurality of angle-dependent filters to the plurality of traces.

33. The method of claim 32, wherein applying the plurality of angle-dependent filters to the plurality of traces comprises applying the plurality of angle-dependent filters to the plurality of traces in a $\tau$-P domain.

34. The method of claim 21, wherein forming the plurality of de-signatured traces comprises forming the plurality of de-signatured traces comprises using a two-dimensional filter.

35. A computer system, comprising:
   a storage unit for storing data representative of a seismic signal, a plurality of traces representative of a plurality of reflected seismic signals that were acquired from one or more seismic receivers, and a plurality of take-off angles and at least one notional signature corresponding to the seismic signal;
   a processor; and
   a memory comprising program instructions executable by the processor to:
      form a plurality of de-signatured traces using the seismic signal, the plurality of traces, the take-off angles, and the at least one notional signature; and
      store the plurality of de-signatured traces to the memory.

36. The computer system of claim 35, wherein the processor is capable of forming a plurality of far-field signatures using the at least one notional signature and the plurality of take-off angles.

37. The computer system of claim 36, wherein the processor is capable of associating the traces with the plurality of take-off angles.

38. The computer system of claim 37, wherein the processor is capable of forming at least one common receiver station gather using the plurality of traces.

39. The computer system of claim 36, wherein the processor is capable of forming a plurality of angle-dependent filters formed from the plurality of far-field signatures.

40. The computer system of claim 39, wherein the processor is capable of applying the plurality of angle-dependent filters to form the plurality of de-signatured traces.

41. The computer system of claim 40, wherein the processor is capable of applying the plurality of angle-dependent filters to form the plurality of de-signatured traces in a $\tau$-P domain.

42. The computer system of claim 41, wherein the processor is capable of interpolating a portion of the traces before applying the plurality of angle-dependent filters to form the plurality of de-signatured traces in the $\tau$-P domain.

43. The computer system of claim 42, wherein the processor is capable of removing the interpolated portion of the traces after applying the plurality of angle-dependent filters to form the plurality of de-signatured traces in the $\tau$-P domain.

44. The computer system of claim 39, wherein the processor is capable of selecting one of the plurality of angle-dependent filters representative of a vertical far-field signature selected from the plurality of far-field signatures.

45. The computer system of claim 44, wherein the processor is capable of performing a vertical de-signature process using the vertical far-field signature.

46. The computer system of claim 35, wherein the processor is capable of forming a two-dimensional filter.

47. An article comprising one or more machine-readable storage media containing instructions that when executed enable a processor to:
   receive a plurality of seismic signals that were acquired from one or more seismic receivers, wherein the plurality of seismic signals comprises a plurality of take-off angles;
   form a plurality of far-field signatures representative of the plurality of seismic signals;
   associate a plurality of traces representative of a plurality of reflections of the seismic signals with the plurality of take-off angles;
   form a plurality of de-signatured traces from the plurality of associated traces and the plurality of far-field signatures; and
   store the plurality of de-signatured traces to a computer memory.

48. The article of claim 47, wherein the one or more machine-readable storage media contain instructions that when executed enable the processor to determine at least one notional signature using at least one near-field detector.

49. The article of claim 47, wherein the one or more machine-readable storage media contain instructions that when executed enable the processor to form a plurality of angle-dependent de-signature filters using the far-field signatures.

50. A method for processing seismic data for geological exploration, comprising:
   generating a plurality of seismic signals having a plurality of take-off angles using at least one seismic source;
   receiving a plurality of reflections of the seismic signals at a plurality of receivers, wherein the plurality of reflected seismic signals have a corresponding plurality of emergent angles at the plurality of receivers;
   recording a plurality of traces representative of the reflected seismic signals;
   forming a plurality of de-signatured traces by associating each of the plurality of traces with at least one of the plurality of takeoff angles; and
   storing the plurality of de-signatured traces to a computer memory.

51. A method for processing seismic data for geological exploration, comprising:
   generating a plurality of seismic signals having a plurality of take-off angles using at least one seismic source;
   receiving a plurality of reflections of the seismic signals at a plurality of receivers, wherein the plurality of reflected seismic signals have a corresponding plurality of emergent angles at the plurality of receivers;
   recording a plurality of traces representative of the reflected seismic signals;

forming a plurality of de-signatured traces from the plurality of seismic signals, the plurality of traces, the plurality of take-off angles, and the plurality of emergent angles using a two-dimensional filter; and storing the plurality of de-signatured traces to a computer memory.

52. An apparatus, comprising:

a storage unit for storing data representative of a seismic signal;

a plurality of traces representative of a plurality of reflected seismic signals that were acquired from one or more seismic receivers;

a plurality of take-off angles;

at least one notional signature corresponding to the seismic signal; and a processor configured to:

form a plurality of de-signatured traces using the seismic signal, the plurality of traces, the take-off angles, and the at least one notional signature;

form a plurality of far-field signatures using the at least one notional signature and the plurality of take-off angles; and store the plurality of far-field signatures to a computer memory.

53. An apparatus, comprising:

a storage unit for storing data representative of a seismic signal;

a plurality of traces representative of a plurality of reflected seismic signals that were acquired from one or more seismic receivers;

a plurality of take-off angles;

at least one notional signature corresponding to the seismic signal; and a processor configured to:

form a plurality of de-signatured traces using the seismic signal, the plurality of traces, the take-off angles, and the at least one notional signature;

form a two-dimensional filter; and store the plurality of de-signatured traces to a computer memory.

\* \* \* \* \*